(No Model.)
E. SANDOW.
ELECTRIC MUSCULAR EXERCISER.
No. 602,774. Patented Apr. 19, 1898.
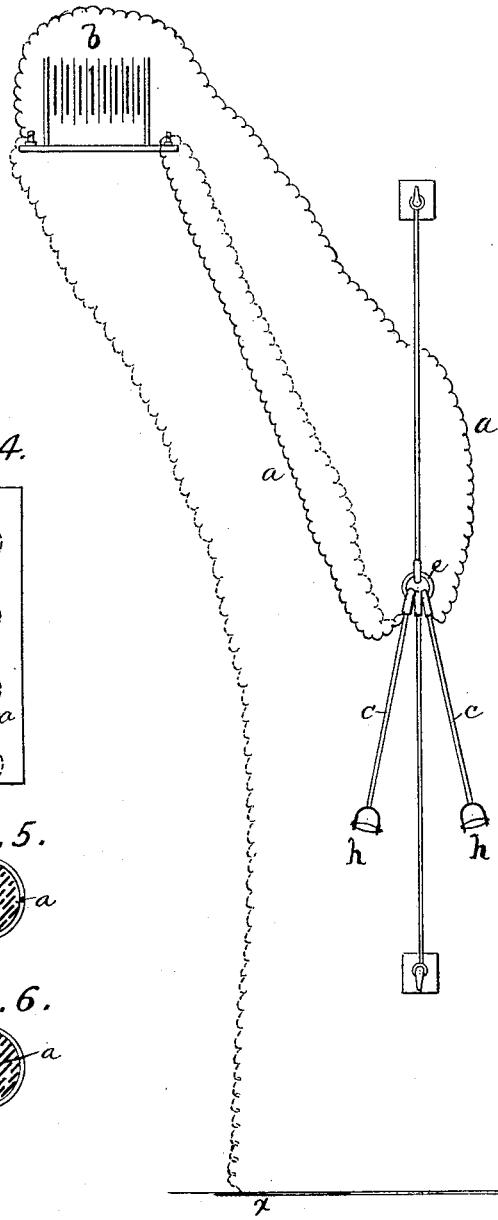
Fig. 1.
Fig. 2.    Fig. 4.
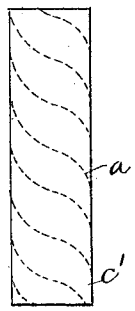 
Fig. 3.    Fig. 5.
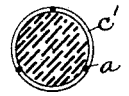 
Fig. 3.ᵃ    Fig. 6.
 
Witnesses:
F. W. Wright.
S. C. Connor.
Inventor
Eugen Sandow
By
Howson and Howson
His Attorneys.

UNITED STATES PATENT OFFICE.

EUGEN SANDOW, OF LONDON, ENGLAND.

ELECTRIC MUSCULAR EXERCISER.

SPECIFICATION forming part of Letters Patent No. 602,774, dated April 19, 1898.

Application filed January 24, 1898. Serial No. 667,798. (No model.)

*To all whom it may concern:*

Be it known that I, EUGEN SANDOW, a subject of the Emperor of Germany, residing at London, England, have invented new and useful Improvements Relating to Muscular Exercisers, of which the following is a specification.

This invention relates to such apparatus for exercising the muscles of the human frame as are provided with handles attached to elastic cords; and the object of the invention is to cause an electric current to pass through the body or limbs at the same time that the muscles are being exercised and developed. For this purpose I connect each handle to an electric battery or other suitable generator or source of electricity by a suitable wire or wires in such a manner that a current of electricity can be applied to the body or limbs as the exerciser is being used without interfering with the elasticity of the cord to which the said handle is attached.

The annexed drawings illustrate one or two ways of applying my invention to exercisers of which the handles are fitted to elastic cords such as described in the specification of Letters Patent No. 588,017, dated August 10, A. D. 1897, granted to myself in the United States of America.

In the drawings, Figure 1 is a front view of such an exerciser, and Figs. 2, 3, 3$^a$, 4, 5, and 6 show how the electric wires can be connected to the handles thereof.

I propose to pass a wire or wires $a$ from the battery $b$ (or other source of electricity) along the cord $c$ in connection with each handle $h$, which are partly or entirely made of metal or other good conductor of electricity in such a manner as not to interfere with the elasticity of the cord $c$, say by weaving it or them in the elastic cover $c'$ in the form of a coil or coils, Figs. 2 and 3, or zigzag, Figs. 4 and 5, or coiling it or them around the elastic strands (see Fig. 3$^a$) or running it or them among the said strands (see Fig. 6) inside the covering $c'$.

The ring or part $e$, to which the coils $c$ are connected, is made of or covered with insulating material; but I do not wish to limit myself to such arrangement, as it can evidently be varied in many ways.

The wires $a$ can both be led from one pole of the battery, the other pole being connected to a metal plate $x$, as seen dotted at Fig. 1, the user standing on the said plate $x$, or one pole of the battery can be connected to one handle and the other pole to the other, as seen by the full lines on Fig. 1.

I claim as my invention—

The combination with an elastic-cord exerciser, of handles attached to the cords of the exerciser, wires attached to the handles and extending the length of the cords, being so united with the cords as to be capable of extending with them so as not to interfere with the elasticity thereof, substantially as and for the purpose described.

In testimony whereof I have signed my name to this specification in the presence of two subscribing witnesses.

EUGEN SANDOW. [L. S.]

Witnesses:
 J. SIMPSON JACK,
 FREDERICK PIATT.